(12) United States Patent
Scarabelli

(10) Patent No.: US 12,254,662 B2
(45) Date of Patent: Mar. 18, 2025

(54) METHOD FOR AUTHENTICATING A FOOD PACKAGE USING PRINTING DATA AND AN APPARATUS THEREOF

(71) Applicant: Tetra Laval Holdings & Finance S.A., Pully (CH)

(72) Inventor: Paolo Scarabelli, Reggio Emilia (IT)

(73) Assignee: Tetra Laval Holdings & Finance S.A., Pully (CH)

( * ) Notice: Subject to any disclaimer, the term of this patent is extended or adjusted under 35 U.S.C. 154(b) by 285 days.

(21) Appl. No.: 17/755,644

(22) PCT Filed: Nov. 18, 2020

(86) PCT No.: PCT/EP2020/082474
§ 371 (c)(1),
(2) Date: May 4, 2022

(87) PCT Pub. No.: WO2021/099348
PCT Pub. Date: May 27, 2021

(65) Prior Publication Data
US 2022/0392041 A1    Dec. 8, 2022

(30) Foreign Application Priority Data

Nov. 20, 2019  (EP) ..................................... 19210290

(51) Int. Cl.
*G06T 7/00* (2017.01)
*G06V 10/40* (2022.01)
*G06V 10/75* (2022.01)
*G06V 30/42* (2022.01)
*G06V 30/424* (2022.01)
*G06V 20/68* (2022.01)

(52) U.S. Cl.
CPC .............. *G06V 10/40* (2022.01); *G06T 7/001* (2013.01); *G06V 10/751* (2022.01); *G06V 30/42* (2022.01);
(Continued)

(58) Field of Classification Search
None
See application file for complete search history.

(56) References Cited

U.S. PATENT DOCUMENTS 9,582,714 B2 *   2/2017   Ross ................... G06F 16/2468
9,965,798 B1 *   5/2018   Vaananen ............... F25D 29/00
(Continued)

FOREIGN PATENT DOCUMENTS

CN           1877662 A   * 12/2006
CN         106875567 A   *  6/2017
(Continued)

OTHER PUBLICATIONS

International Search Report and Written Opinion in PCT Application No. PCT/EP2020/082474 dated Feb. 18, 2021 in 11 pages.
(Continued)

*Primary Examiner* — Akwasi M Sarpong
*Assistant Examiner* — Pawan Dhingra
(74) *Attorney, Agent, or Firm* — Knobbe, Martens, Olson, & Bear, LLP

(57) ABSTRACT

A method for authenticating a food package holding a food product can include receiving sample image data depicting the food package, identifying a sample print feature sub-set of the food package, identifying a sample geometric feature sub-set of the food package, generating a sample feature set based on the sample print feature sub-set and the sample geometric feature sub-set, receiving a reference feature set, wherein the reference feature set is generated based on a reference print feature sub-set and a reference geometric feature sub-set identified in reference image data, wherein the reference image data is captured in a food packaging system arranged to produce food packages, comparing the
(Continued)

sample feature set and the reference feature set, and in case of match, providing an indication that the food package is authentic.

20 Claims, 3 Drawing Sheets

(52) U.S. Cl.
CPC ............ *G06V 30/424* (2022.01); *G06V 20/68* (2022.01); *G06V 2201/06* (2022.01)

(56) References Cited

U.S. PATENT DOCUMENTS

| | | | |
|---|---|---|---|
| 10,169,677 B1* | 1/2019 | Ren | G06V 20/52 |
| 2001/0014169 A1* | 8/2001 | Liang | G07D 7/12 |
| | | | 250/252.1 |
| 2015/0117701 A1* | 4/2015 | Ross | G06V 10/225 |
| | | | 382/100 |
| 2016/0012310 A1* | 1/2016 | Kozicki | G06T 7/0012 |
| | | | 382/218 |
| 2024/0233116 A1* | 7/2024 | Melandri | H04N 23/90 |

FOREIGN PATENT DOCUMENTS

| | | | | |
|---|---|---|---|---|
| EP | 3825912 A1 * | 5/2021 | | G06K 9/46 |
| JP | 2018-514007 A | 5/2018 | | |
| JP | 2018-136833 A | 8/2018 | | |

OTHER PUBLICATIONS

Office Action received in Japanese Application No. 2022-529458 dated Dec. 10, 2024.

* cited by examiner

METHOD FOR AUTHENTICATING A FOOD PACKAGE USING PRINTING DATA AND AN APPARATUS THEREOF

TECHNICAL FIELD

The invention generally relates to food packaging technology. More particularly, it is related to a method for authenticating a food package and an apparatus thereof.

BACKGROUND ART

To assure that a food product is safe to consume the product is processed in a controlled environment such that a risk that unwanted microorganisms are either killed off or prevented from entering into the product. In addition to assuring that the product is safe to consume, such processing may also increases a shelf life of the product. To assure that unwanted microorganisms do not enter the food product after this has been processed and filled into a food package, the food package is often made such that the unwanted microorganisms, as well as oxygen and light, are hindered from coming into contact with the product. For a consumer to know that the product has been processed and packaged in a way that assure food safety, information is provided on the package, which provides for that the consumer can make a conscious choice.

Unfortunately, all food products that are being sold today are not legit and what may appear to be a well-known product on a super market shelf may in fact be a counterfeit product. As an effect, the information provided on the product cannot always be trusted. Even though food producers as well as food retailers in general have processes in place for detecting counterfeit products, there is nevertheless a problem. Many counterfeit products are difficult to distinguish from legit products, and thus there is a risk that consumers choose counterfeit products over legit products. Since there is extensive legislations in most countries regarding food safety, this is not only a problem in terms of lost income for legit food producers, but also a food safety problem. Since the producer of the counterfeit product is unknown, there is no one to hold responsible and, as an effect, there is no real incentive for the producer of the counterfeit products to live up to set standards.

One way of solving the problem of counterfeit food products is to mark the packages with a unique code, e.g. a QR code. By having these unique codes the packages may be traced from the food producer to the consumer, and in doing so the risk that counterfeit products reach the consumers is reduced. However, using unique codes adds costs for the food producers. In addition, the codes may be copied and as an effect there is still a risk that counterfeit products reach the consumers.

Even though there are technologies available for reducing the risk that counterfeit products reach consumers, there is a need for reducing the risk further by providing technologies that are reliable as well as cost efficient.

SUMMARY

It is an object of the invention to at least partly overcome one or more of the above-identified limitations of the prior art. In particular, it is an object to provide a solution for how an authenticity of a food package can be assured without requiring more complex, and thus more expensive, food packages.

According to first aspect it is provided a method for authenticating a food package holding a food product, said method comprising receiving sample image data depicting the food package, identifying a sample print feature sub-set of the food package, identifying a sample geometric feature sub-set of the food package, generating a sample feature set based on the sample print feature sub-set and the sample geometric feature sub-set, receiving a reference feature set, wherein the reference feature set is generated based on a reference print feature sub-set and a reference geometric feature sub-set identified in reference image data, wherein the reference image data is captured in a food packaging system arranged to produce food packages, comparing the sample feature set and the reference feature set, and in case of match, providing an indication that the food package is authentic.

By the term "print feature sub-sets" is here meant features that can be related to any print provided on the food package, e.g. print made by an inkjet printer, digital printing and/or cliché-based printing technology.

By the term "geometric feature sub-set" is here meant features that can be related to the geometry or the shape of the food package, e.g. length, height or width of the food package. Put differently, the geometric feature sub-set may be related to geometrical appearance on the food package.

It should be noted that the step of generating the sample feature set may be performed in different ways. According to one non-limiting example, the sample print feature sub-set and the sample geometric feature sub-set may be arranged as two different sub-sets within the sample feature set. The same may apply to the reference print feature sub-set and the reference geometric feature sub-set. According to another non-limiting example, the sample print feature sub-set and the sample geometric feature sub-set may be merged such that the sample feature set may comprise the sample print feature sub-set and the sample geometric feature sub-set, but not as two distinct sub-sets within the sample feature set. The same may apply to the reference print feature sub-set and the reference geometric feature sub-set.

It should be noted that depending on the arrangement of the sample feature set, the comparison step may be performed in different ways. According to one non-limiting example, the comparison step may comprise two "sub-steps, wherein one sub-step may relate to a comparison between the sample print feature sub-set and the reference print feature sub-set and wherein another sub-step may relate to a comparison between the sample geometric feature sub-set and the reference geometric feature sub-set. According to another non-limiting example, the comparison between the sample print feature sub-set and the reference print feature sub-set and the comparison between the sample geometric feature sub-set and the reference geometric feature sub-set may be performed simultaneously such that only one comparison is performed. This may be the case when the two sub-sets are merged as described above.

The print features sub-set that may comprise printing morphology data, that is, information related to shape of the printing, e.g. how letters are printed instead which letters that are printed, may be related to different kinds of printing and also to folding of the packages. For instance, printing made by an inkjet printer after the package has been filled and sealed may comprise variations due to that ink is used and that time provided for allowing the ink to cure is limited. These variations may comprise gaps in numbers and/or letters related to best before date. Another possibility may be that extra printing objects, such as a dot or line not intended to be printed, are printed. Even though these may be small and not noticed by consumers, these may be used for identification purposes.

The print features may also be related to a combination of printing and folding. For instance, in case the folding of the package is made such that a first and a second rear panel is slightly off set before making a longitudinal sealing, this may result in that e.g. lines in a décor extending over the longitudinal sealing comprises a discontinuity. Such discrepancy may be used as a print feature.

Further, there may be dependencies between the print feature set and the geometric feature set. For instance, in case the first and second rear panels are off set before making the longitudinal sealing, this may result in both printing as well as geometric deviations, which may be useful for identifying the package and which may be reflected in the sample print feature sub-set and the sample geometric feature sub-set, respectively. These dependencies may be useful for assessing quality of the sample image data. For instance, in case the sample print feature sub-set comprises data indicating that the longitudinal sealing is off set and this is not reflected in the geometric feature sub-set, this may be indication that the sample image data is not depicting the package adequately. The dependencies may be set manually or they may be determined by using sample image data received from a plurality of packages.

An advantage by using both the print feature sub-set and the geometric feature sub-set is that a more reliable authentication of the food package may be achieved.

The sample print feature sub-set and the reference print feature sub-set may comprise best before day data identified from a best before day print provided onto the food package in the food packaging system.

The sample print feature sub-set and the reference print feature sub-set may comprise a unique code identified from a two-dimensional code print provided onto the package in the food packaging system.

The sample print feature sub-set and the reference print feature sub-set may comprise printing morphology data.

The term "morphology" can refer to "study of shape". By the term "printing morphology data" is here meant printing data related to the shape or the form of the printing on the package. According to one non-limiting example, the printing morphology data may relate to the shape or form of e.g. the best before day print or of two-dimensional code print.

The sample print feature sub-set and the reference print feature sub-set may comprise position data for a graphical element identified in a décor of a packaging material of the food package.

The sample geometric feature sub-set and the reference geometric feature sub-set may comprise package top portion form type data.

The sample geometric feature sub-set and the reference geometric feature sub-set may comprise position data of a longitudinal and/or a transversal sealing section.

The sample geometric feature sub-set and the reference geometric feature sub-set may comprise position data of a straw hole.

The sample geometric feature sub-set and the reference geometric feature sub-set may comprise deviation points data related to an opening device.

The reference image data may be captured during a quality control in the food packaging system.

The method may further comprise receiving a reference identification number related to the reference feature set for determining time and/or location of capturing the reference image data in the food packaging system.

According to a second aspect it is provided an apparatus for authenticating a food package holding a food product, said apparatus comprising
 a data communications module configured to receive sample image data depicting the food package, receive a reference feature set, and transmit an indication that the food package is authentic,
 a processor and a memory configured to identify a sample print feature sub-set of the food package, identify a sample geometric feature sub-set of the food package, and generate a sample feature set based on the sample print feature sub-set and the sample geometric feature sub-set, compare the sample feature set and the reference feature set, and in case of match, and provide the indication that the food package is authentic in case of match between the sample feature set and the reference feature set, wherein the reference feature set is generated based on a reference print feature sub-set and a reference geometric feature sub-set identified in the reference image data, wherein the reference image data is captured in a food packaging system arranged to produce food packages.

The sample print feature sub-set and the reference print feature sub-set may comprise best before day data identified from a best before day print provided onto the food package in the food packaging system.

The sample print feature sub-set and the reference print feature sub-set may comprise a unique code identified from a two-dimensional code print provided onto the package in the food packaging system.

The sample geometric feature sub-set and the reference geometric feature sub-set may comprise position data of a longitudinal and/or a transversal sealing section.

Features and advantages presented in relation to the first aspect also applies to the second aspect.

Still other objectives, features, aspects and advantages of the invention will appear from the following detailed description as well as from the drawings.

BRIEF DESCRIPTION OF THE DRAWINGS

Embodiments of the invention will now be described, by way of example, with reference to the accompanying schematic drawings, in which.

DETAILED DESCRIPTION

Figure 1:
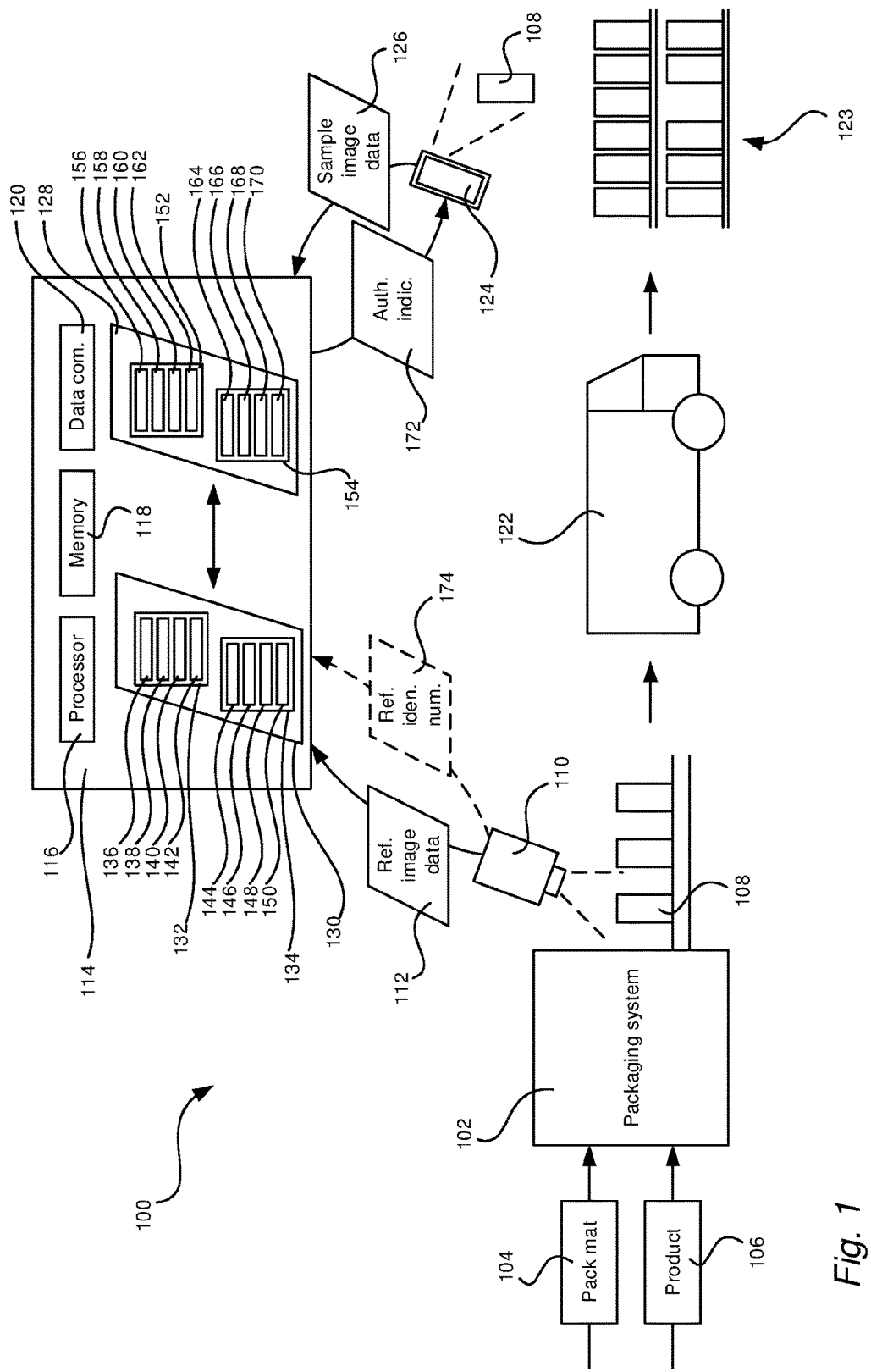
FIG. 1 is a general illustration of a system for authenticating a food package.

FIG. 1 illustrates a system 100 for reducing a risk that counterfeit food products reach consumers by way of example. A packaging system 102, such as a roll-fed carton packaging machine, can be made to receive packaging material 104, e.g. carton-based packaging material printed in a converting factory and rolled onto a reel, as well as a product 106, e.g. orange juice, to be filled into packages 108 formed by the packaging system 102. By using a camera 110, reference image data 112 can be captured. The reference image data 112 can be transferred to an apparatus 114 comprising a processor 116, a memory 118 and a data communications module 120. The apparatus 114 can be a remote server that can be accessed from various locations such that later authentication of the packages 108 are not restricted in terms of location. Further, to make sure that the reference image data 112 is not tampered with, this data may be stored securely, e.g. in a secure element, and/or in that this is stored in encrypted form. To provide for that later comparisons can be made efficiently, the reference image data 112 may be transformed into characteristic features. An advantage with this is that comparisons can be made faster as well as that less storage space is required.

The camera 110 can be used not only for capturing reference image data 112, but also for quality control purposes. Put differently, if an analysis of image data captured by the camera 110 arrives in that the packages 108, depicted in the image data, is not within set thresholds, the packaging system 102 is to be stopped and/or an operator is to be notified. However, in case the packages 108 are determined by the apparatus 114 or a separate quality control dedicated apparatus to be within the thresholds, the image data will be stored in the apparatus as the reference image data 112, and as described above optionally processed into a different format.

As illustrated in FIG. 1, a top section and a front section of the packages 108 may be covered by the camera 110. The reference image data 112 may however also cover a bottom section and/or side panels of the packages 108. To cover several sections of the packages 108, a plurality of cameras may be used even though the example illustrated in FIG. 1 only comprises one camera. If using several cameras, these may be connected to each other to make sure that the image data from several cameras can be linked to a specific package.

After having captured and transferred the reference image data 112 to the apparatus 114, the packages 108 are distributed, using for example a truck 122, to a retailer and placed on a store shelf 123. To assure that the food packages 108 are authentic, that is, the food packages are produced as claimed, a camera-equipped device 124 may be used for capturing sample image data 126. After being captured, the sample image data 126 can be transferred to the apparatus 114 such that this data can be compared with the reference image data 112.

The comparison between the sample image data 126 and the reference image data 112 can be made in that a sample feature set 128 is generated based on the sample image data 126, and a reference feature set 130 generated based on the reference image data 112. The reference feature set 130 may in turn comprise a reference print feature sub-set 132 and a reference geometric feature sub-set 134. The reference print feature sub-set 132 can comprise features related to printing of the packages 108 that can be used for distinguishing different packages from each other. These features may be deliberately made or they may be an effect of that each and every package comprise minor deviations, that is, unintentionally made.

Figure 2:
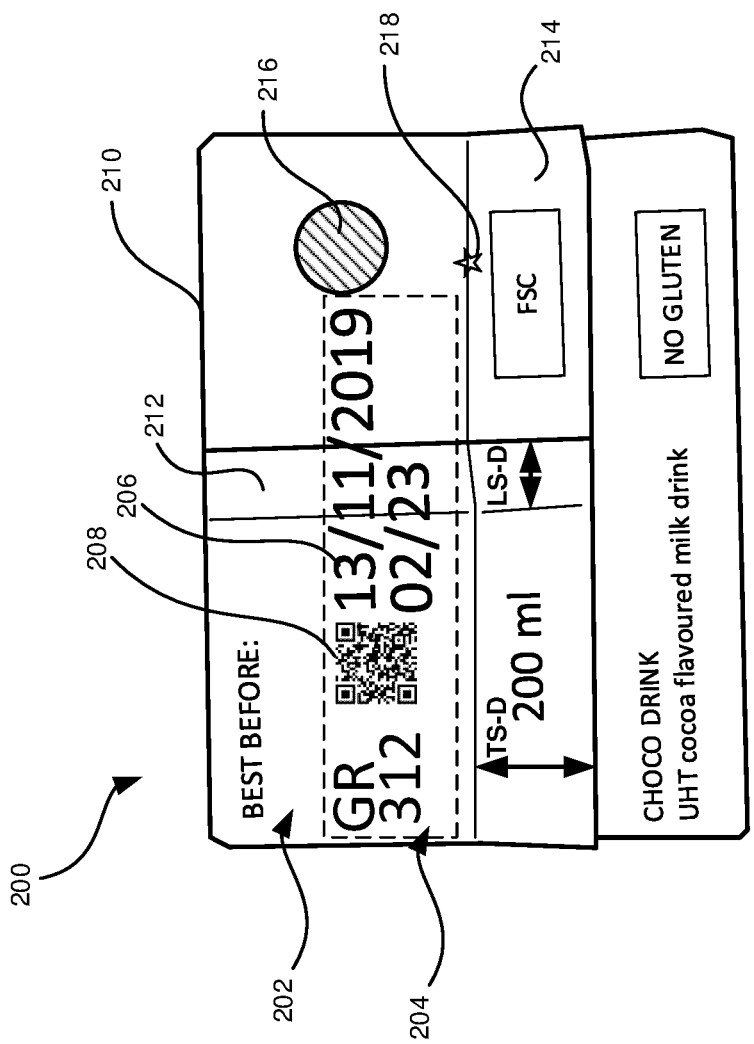
FIG. 2 illustrates a top section of the food package.

The reference print feature sub-set 132 may comprise best before data 136. The best before data 136 may be identified, or extracted, based on a best before day print provided on the package as illustrated in FIG. 2. The best before day print may be provided by using an inkjet printer that may be placed on the same site as the packaging system 102. The best before day print may comprise a date when the product is best before, but also additional information related to which filling machine that was used.

Further, the reference print feature sub-set 132 may comprise a unique code 138 that is extracted from a two-dimensional code, such as a QR code, provided on the package.

Still further, the reference print feature sub-set 132 may comprise printing morphology data 140 extracted based on e.g. the best before day print and/or the two-dimensional code print. The morphology data 140 can be related to a form of the best before day print and/or the two-dimensional code print instead of the content. For instance, a number in the best before day print that comprises deviations will be reflected in the morphology data 140, but the deviations will not be reflected in the best before day data 136.

Additionally, the reference print feature sub-set 132 may comprise position data 142 related to a graphical element in a décor of the packaging material 104. The décor may be printed on site using e.g. digital printing, but, as is more common today, the décor may also be printed off site in a so-called converting factory by applying flexography technology or other cliché-based printing technologies.

The reference geometric feature sub-set 134 is related to geometrical appearance of the packages 108. This may comprise package top portion form type data 144, i.e. data related to a shape of the top portion. For instance, if the top portion of a particular package is rhombus-shaped seen from above, but nevertheless within quality standard thresholds, this may be used for distinguishing this particular package from other packages.

Further, the reference geometric feature sub-set 134 may comprise position data 146 for a longitudinal sealing section and/or a transversal sealing section. The longitudinal section and the transversal sealing section are most often perpendicular to each other, but due to various circumstances it may be that the two sections are not perfectly perpendicular to each other, but still within quality standards. Such variation can be used as the position data. Also a width, a length, a shape etc of the longitudinal and transversal sealing section can be used as the position data 146.

In case the packages 108 are provided with straw holes, position data 148 for the straw hole may be part of the reference geometric feature sub-set 134.

Further, deviation points data 150 related to an opening device placed on the package may be part of the reference geometric feature sub-set 134. The opening device may be an injection-molded top section, for example as the top portion of a carton bottle package, e.g. Tetra Top™. It may however also be a pre-applied opening device, i.e. an opening device applied before the package is filled and closed, a post-applied opening device, i.e. an opening device applied after the package is filled and closed, or an injection molded opening device molded onto the package in the packaging system 102.

Correspondingly, the sample feature set 128 may comprise a sample print feature sub-set 152 and a sample geometric feature sub-set 154. In line with the reference print feature sub-set 132, the sample print feature sub-set 152 may comprise a best before day data 156, a unique code 158, printing morphology data 160, position data 162 for a graphical element. Similarly, the sample geometric feature sub-set 154 may comprise top portion form type 164, position data 166 for a longitudinal and/or transversal sealing section, position data 168 for the straw hole, and deviation points data 170.

Depending on type of package, level of required reliability, hardware restrictions etc, a complexity of how the different features are determined as well as compared can be adjusted. Further, it is also possible to only include a sub-set of the different features. Still further, having many features, not all features in the reference feature set 130 are required to be determined for the sample feature set 128 to be able to make a correct authentication.

It is also possible to use a multi-step approach in which a few features are compared in a first step. In case a reliable decision regarding authenticity can be made based on the comparison in this first step, no further steps are conducted, but if no reliable decision can be made a second step is performed in which additional features are taken into account and/or a more detailed comparison is made.

After having compared the sample feature set 128 with the reference feature set 130, an indication 172 of authenticity can be transferred from the apparatus 114 to the device 124 and/or to other apparatuses requesting information about the authenticity.

To further facilitate the comparison, a reference identification number 174 may be transferred from the camera 110, or other equipment being part in forming the reference image data 112, to the apparatus 114. With the reference identification number 174 it is possible for the apparatus 114 to know when the packages 108 are produced and/or where they are produced. This information may be helpful in that reference feature sets 130 related to packages produced far away from a site in which the sample image data 126 is captured and also for a long time ago may be left out, which as an effect result in that fewer comparisons are needed for determining authenticity.

FIG. 2 illustrates by way of example a top section 200 of the food package 108. In view of printing provided on the package 108, there is a first area 202 in which off-site printing, e.g. flexography printing, is provided and a second area 204 in which on-site printing, e.g. inkjet printing, is provided. The second area 204 may comprise best before day print 206 and/or a two-dimensional code print 208, such as a QR code. Both the best before day print 206 and the two-dimensional code print 210 may be used for generating the reference and/or sample print features sub-set 132,152, more particularly the best before day data 136, 156 and the unique code 138, 158.

An outline 210 of the top section 200 may be used for generating features related to the reference and/or sample geometric feature sub-set 134, 154, e.g. the top portion form type data 144, 164.

A longitudinal sealing section 212 and/or a transversal sealing section 214 may be used for generating position data 146, 166 for the longitudinal section and/or the transversal sealing section. This may be made in different ways. For instance, a longitudinal sealing section width LS-D and a transversal sealing section width TS-D may be determined and used as basis for determining the position data.

The straw hole 216 may be provided on the top section 200. As explained above, a position of the straw hole 216 may be determined and used as one part of the reference and/or sample geometrical feature sub-set 132, 152.

In the first area 202 of the top section, a graphical element 218 may be provided such that the position data 142, 162 of this can be determined and used as one of the features in the reference and/or sample print feature sub-set 132, 152. The graphical element 218 may be provided in part of the packages even though being printed using flexography printing. This may be achieved by having several clichés on a reel placed after each other in the rotational direction of the reel and with only part of the clichés provided with the graphical element 218.

Figure 3:
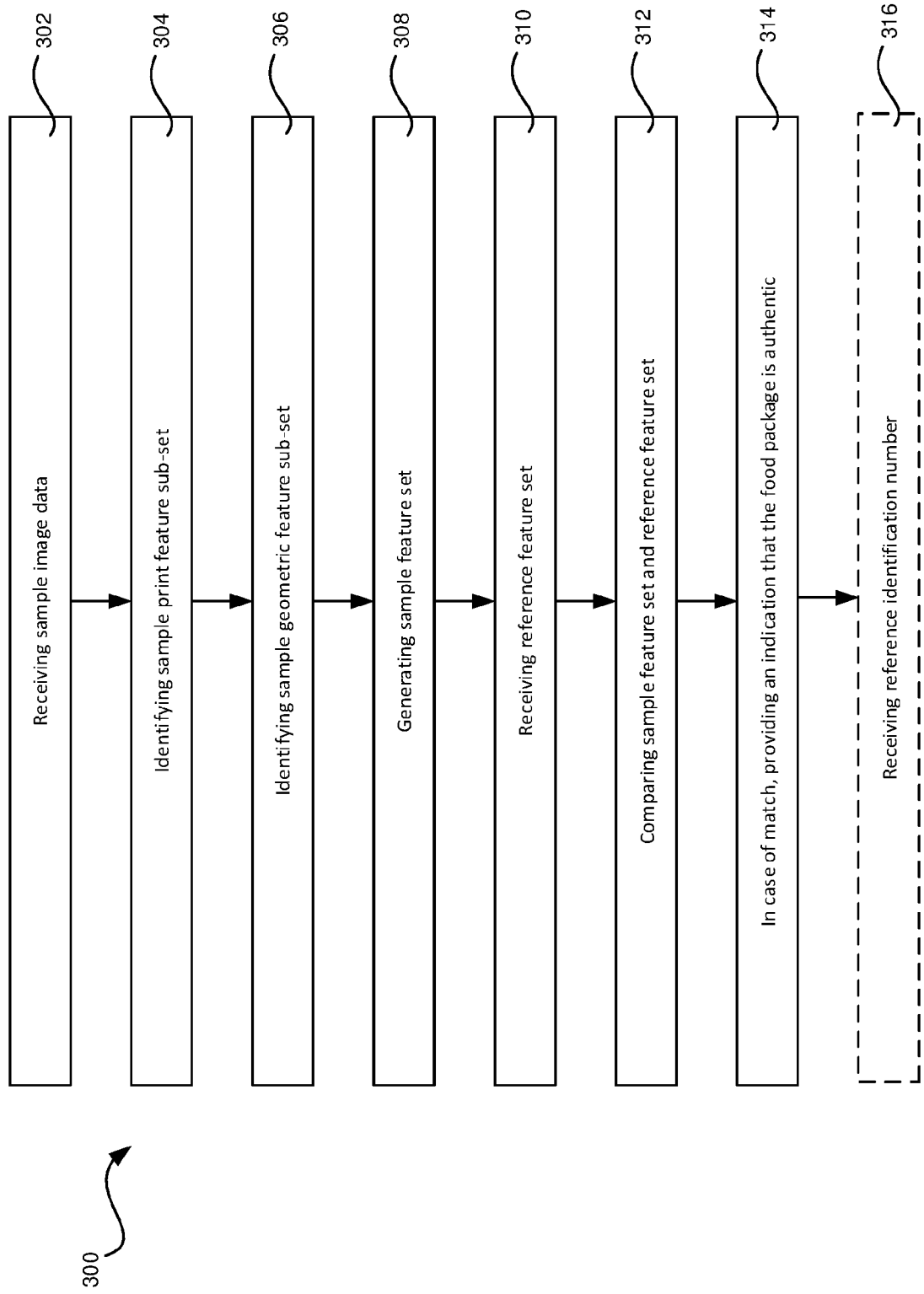
FIG. 3 is a flowchart illustrating steps in a method for authenticating the food package.

FIG. 3 presents a flow chart illustrating a method 100 for authenticating the food package 108.

In a first step 302 the sample image data 126 depicting the food package 108 can be received. Then, in a second step 304, the sample print feature sub-set 152 of the food package 108 can be identified. Further, in a third step 306, the sample geometric feature sub-set 154 of the food package 108 can be identified. In a fourth step 308, based on the sample print feature sub-set 152 and the sample geometric feature sub-set 154 a sample feature set 128 can be generated. In a fifth step 310 a reference feature set 130 can be received. The reference feature set 130 can be generated based on a reference print feature sub-set 132 and a reference geometric feature sub-set 134 identified in reference image data 112, wherein the reference image data 112 can be captured in the food packaging system 102 arranged to produce food packages. Thereafter, in a sixth step 312, the sample feature set 128 and the reference feature set 130 can be compared. Then, in case of match, in a seventh step 314, the indication 172 that the food package 108 is authentic can be provided.

Optionally, in an eighth step 316, the reference identification number 174 related to the reference feature set for determining time and/or location of capturing the reference image data in the food packaging system can be received.

From the description above follows that, although various embodiments of the invention have been described and shown, the invention is not restricted thereto, but may also be embodied in other ways within the scope of the subject-matter defined in the following claims.

The invention claimed is:

1. A method for authenticating a food package of a plurality of food packages holding a food product, said method comprising:
   receiving sample image data depicting the food package from a device,
   identifying a sample print feature sub-set and a sample geometric feature sub-set of the food package based on the sample image data,
   generating a sample feature set based on the sample print feature sub-set and the sample geometric feature sub-set,
   receiving a reference feature set, wherein the reference feature set is generated based on a reference print feature sub-set and a reference geometric feature sub-set identified in reference image data, wherein the reference image data is captured in a food packaging system arranged to produce the plurality of food packages, the sample print feature sub-set and the reference print feature sub-set comprising at least printing morphology data related to a shape of printing on the food packages and not to a context of the printing, the shape of printing comprising variations of at least one symbol in the printing produced by a printer and the variations are configured to be detected by a processor of a quality control apparatus but not by a naked eye of a consumer,
   comparing the sample feature set and the reference feature set to determine a match, wherein determining the match comprises:
      comparing a first sample feature of the sample feature set with a first reference feature of the reference feature set,
      at a first time, in response to a match between the first sample feature and the first reference feature, determine the match between the sample feature set and the reference feature set, and
      at a second time, in response to a mismatch between the first sample feature and the first reference feature, comparing a second sample feature of the sample feature set with a second reference feature of the reference feature set, and
   in case of the match, providing an indication that the food package is authentic to at least one of the device or another apparatus requesting authentication of the food package, wherein the method is performed under control of the processor of the quality control apparatus.

2. The method according to claim 1, wherein the sample print feature sub-set and the reference print feature sub-set comprise best before day data identified from a best before day print provided onto the food package in the food packaging system.

3. The method according to claim 2, wherein the sample print feature sub-set and the reference print feature sub-set comprise the printing morphology data of the best before day data.

4. The method according to claim 1, wherein the sample print feature sub-set and the reference print feature sub-set comprise a unique code identified from a two-dimensional code print provided onto the package in the food packaging system.

5. The method according to claim 1, wherein the sample print feature sub-set and the reference print feature sub-set comprise position data for a graphical element identified in a décor of a packaging material of the food package.

6. The method according to claim 1, wherein the sample geometric feature sub-set and the reference geometric feature sub-set comprise package top portion form type data.

7. The method according to claim 1, wherein the sample geometric feature sub-set and the reference geometric feature sub-set comprise position data of a longitudinal and/or a transversal sealing section.

8. The method according to claim 1, wherein the sample geometric feature sub-set and the reference geometric feature sub-set comprise position data of a straw hole.

9. The method according to claim 1, wherein the sample geometric feature sub-set and the reference geometric feature sub-set comprise deviation points data related to an opening device.

10. The method according to claim 1, further comprising: receiving a reference identification number related to the reference feature set for determining time and/or location of capturing the reference image data in the food packaging system, the time and/or location being associated with the production of the food package.

11. The method according to claim 1, wherein the reference image data is encrypted and wherein the reference feature is generated by decrypting the reference image data.

12. The method according to claim 1, wherein the food package is distributed from the food packaging system for availability to the consumer in response to the reference image data being within a threshold image data set.

13. The method according to claim 1, wherein the reference image data comprises a top section of a reference food package of the plurality of food packages, a front section of the reference food package, and at least one of a bottom section or a side panel of the reference food package, the reference image data captured by a plurality of cameras in the food packaging system.

14. The method according to claim 1, wherein the reference feature set and the sample feature set comprise an equal number of corresponding features, and the match comprises at least a threshold number of matches between the corresponding features of the reference feature set and the sample feature set.

15. The method according to claim 1, wherein the variations comprise a gap between at least two of the at least one symbol produced by the printer.

16. The method according to claim 1, wherein the at least one symbol comprises at least one of a dot or a line in the printing, and wherein the variations comprise at least one of the dot or the line that is not intended to be printed by the food packaging system.

17. An apparatus for authenticating a food package of a plurality of food packages under control of a quality control apparatus comprising a processor, the food package holding a food product, said apparatus comprising:
   a data communicator configured to receive sample image data depicting the food package from a device, receive a reference feature set, and transmit an indication that the food package is authentic to at least one of the device or another apparatus requesting authentication of the food package, and
   the processor configured to identify a sample print feature sub-set and a sample geometric feature sub-set of the food package based on the sample image data, generate a sample feature set based on the sample print feature sub-set and the sample geometric feature sub-set, compare the sample feature set and the reference feature set to determine a match, and provide the indication that the food package is authentic in case of the match between the sample feature set and the reference feature set,
   wherein the reference feature set is generated based on a reference print feature sub-set and a reference geometric feature sub-set identified in reference image data, and wherein the reference image data is captured in a food packaging system arranged to produce the plurality of food packages, the sample print feature sub-set and the reference print feature sub-set comprising at least printing morphology data related to a shape of printing on the food packages and not to a context of the printing, the shape of printing comprising variations of at least one symbol in the printing produced by a printer and the variations are configured to be detected by the processor of the quality control apparatus but not by a naked eye of a consumer, p1 wherein the match is determined by:
   comparing a first sample feature of the sample feature set with a first reference feature of the reference feature set,
   at a first time, in response to a match between the first sample feature and the first reference feature, determine the match between the sample feature set and the reference feature set, and
   at a second time, in response to a mismatch between the first sample feature and the first reference feature, comparing a second sample feature of the sample feature set with a second reference feature of the reference feature set.

18. The apparatus according to claim 17, wherein the sample print feature sub-set and the reference print feature sub-set comprise best before day data identified from a best before day print provided onto the food package in the food packaging system.

19. The apparatus according to claim 17, wherein the sample print feature sub-set and the reference print feature sub-set comprise a unique code identified from a two-dimensional code print provided onto the package in the food packaging system.

20. The apparatus according to claim 17, wherein the sample geometric feature sub-set and the reference geometric feature sub-set comprise position data of a longitudinal and/or a transversal sealing section.

* * * * *

UNITED STATES PATENT AND TRADEMARK OFFICE
CERTIFICATE OF CORRECTION

PATENT NO. : 12,254,662 B2
APPLICATION NO. : 17/755644
DATED : March 18, 2025
INVENTOR(S) : Paolo Scarabelli Page 1 of 1

It is certified that error appears in the above-identified patent and that said Letters Patent is hereby corrected as shown below:

In the Claims

Column 10, Line 37, Claim 17, delete "consumer, p1 wherein" and insert -- consumer, wherein --.

Signed and Sealed this
Thirteenth Day of May, 2025

Coke Morgan Stewart
*Acting Director of the United States Patent and Trademark Office*